Aug. 12, 1952     G. C. ERB     2,606,685
FRICTION TOP CONTAINER WITH ESCAPE FEATURE
Filed Nov. 10, 1949
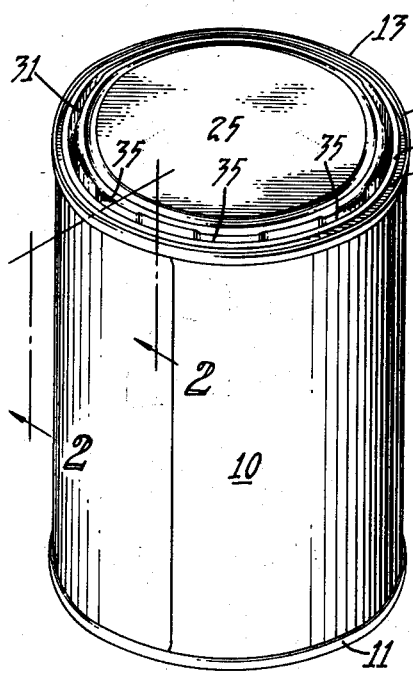
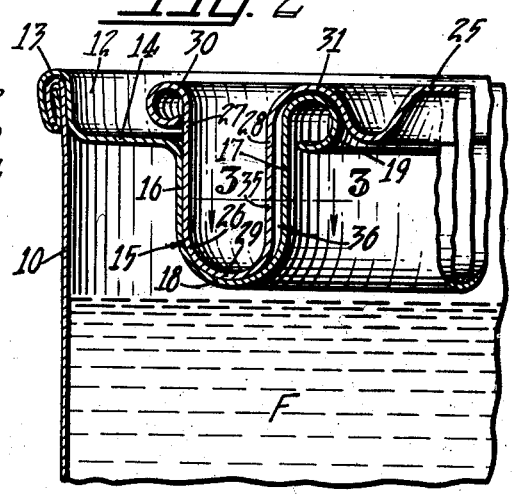
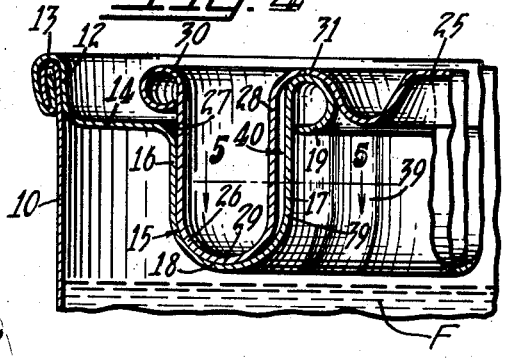
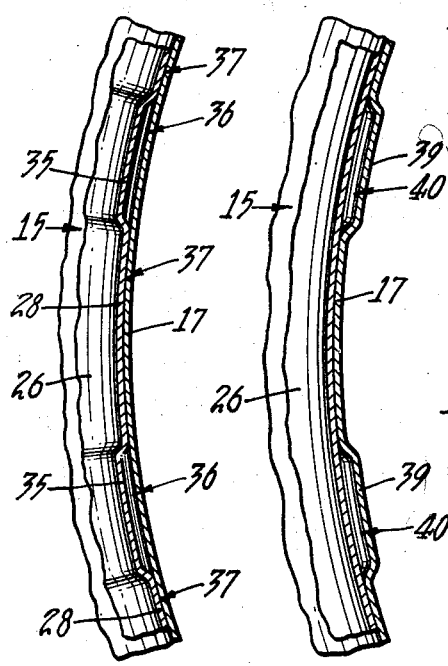
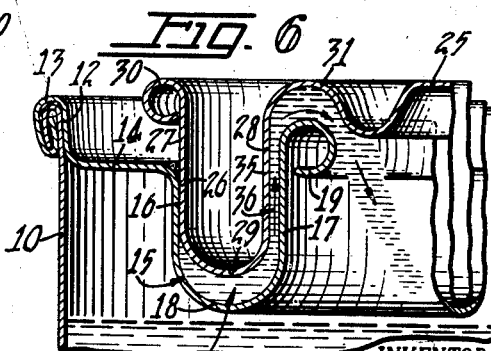
INVENTOR.
GEORGE C. ERB, deceased,
by Annie B. Erb, executrix
BY Charles H. Erne
Ivan D. Thornburgh
ATTORNEYS Patented Aug. 12, 1952

2,606,685

UNITED STATES PATENT OFFICE 2,606,685

FRICTION TOP CONTAINER WITH ESCAPE FEATURE

George C. Erb, deceased, late of Flushing, N. Y., by Annie B. Erb, executrix, Flushing, N. Y., assignor to American Can Company, New York, N. Y., a corporation of New Jersey Application November 10, 1949, Serial No. 126,643

6 Claims. (Cl. 220—42)

The present invention relates to an improved container for paints or other fluids and provides a double tight friction top construction which permits paint which has become entrapped in the friction channel to be forced out of the channel and returned to the interior of the container when the friction plug is pressed into sealing position.

At the present time, the most popular type of paint can in use is the double-tight friction top variety wherein a U-shaped sealing channel formed in the friction ring of the can body cooperates with a complementary U-shaped bead in the friction plug cover to provide a multiple friction wall seal.

It frequently happens, however, that after the can has been opened and some of the liquid paint poured out or used the sealing channel becomes clogged or at least partially filled with paint. When the consumer attempts to reseal the container this accumulation of paint in the channel prevents the cover from being pressed completely home and results in an insecure reclosure.

The present invention overcomes this condition by providing, in the inner friction wall of either the body or the cover, grooves or passageways which communicate with the interior of the can. As a result, when the cover is pressed into sealing position it acts as a piston to force the entrapped paint through the passageways and into the interior of the can, thus clearing the friction channel and permitting the cover to be fully seated therein.

An object of the present invention, therefore, is to provide a friction top container having incorporated therein means which permit the displacement and removal by the friction plug of fluid such as paint which may collect in the friction channel and which, if not displaced, would prevent a tight friction seal.

Another object of the invention is to provide such a container at little or no additional cost over the conventional double-tight container.

A further object is to provide a container having fluid displacement passageways, as hereinbefore described, which container retains the advantage of the tight mechanical friction seal which is characteristic of double-tight containers.

Numerous other objects and advantages of the invention will be apparent as it is better understood from the following description, which, taken in connection with the accompanying drawings, discloses a preferred embodiment thereof.

Referring to the drawings:

Figure 1 is a perspective view illustrating a container embodying an exemplary form of the present invention;

Fig. 2 is an enlarged fragmentary detail taken substantially along a plane indicated by the lines 2—2 in Fig. 1 and showing the container in fully closed position;

Fig. 3 is a horizontal sectional detail taken substantially along the line 3—3 in Fig. 2;

Fig. 4 is a view similar to Fig. 2 but showing a modified form of the invention;

Fig. 5 is a sectional view similar to Fig. 3 and taken substantially along the line 5—5 in Fig. 4, and Fig. 6 is a vertical sectional view of the parts of the container illustrated in Fig. 2 in partially closed position, the view showing how fluid which has collected in the friction channel of the container is forced into the interior of the container when the friction cover is pressed into sealing position.

As a preferred or exemplary embodiment of the present invention, Fig. 1 illustrates a paint can or similar container comprising a cylindrical body 10 having the usual bottom end member 11 permanently secured thereto in any suitable manner to provide a fluid containing member. A friction ring 12 is secured to the upper end of the body 10, preferably by means of a double seam 13 (see also Fig. 2), or the friction ring may be integral with the container body 10 and form an integral extension thereof. The friction ring 12 includes a countersunk panel section 14 which merges into an annular U-shaped friction sealing trough or channel 15.

The channel 15 comprises an outer vertical friction wall 16, an inner vertical friction wall 17 and a connecting curved section 18. The inner friction wall 17 terminates at its upper end in an annular curl 19 which surrounds and defines the mouth of the container and which is adapted to serve as a brush wiper.

A friction plug cover 25 is provided with a depending U-shaped sealing rib or bead 26 (Fig. 2) which is complementary in shape to the body channel 15 and frictionally engages therein to seal the can. The friction bead 26 is formed with spaced vertical outer and inner friction walls 27, 28 and a curved connecting wall 29, the outer friction wall 27 merging at its upper end into a pry-off curl 30 and the inner friction wall 28 merging into an annular bead 31 which is spaced slightly away from the curl 19 of the friction ring 12 when the cover is fully seated on the ring.

When the cover 25 is pressed into sealing position on the body 10 the body channel walls 16, 17, 18 and the corresponding cover bead walls 27, 28, 29 contact each other in frictional engagement, thus producing a leakproof, hermetic friction seal. The bead 26 is normally made slightly oversized with respect to the channel so that considerable downward pressure must be exerted to force it into the channel. Hence, the vertical friction walls 27, 28 of the bead wedge tightly against the vertical friction walls 16, 17 of the body to increase the mechanical holding strength of the friction seal.

After the can is opened by the ultimate consumer, it frequently happens that a quantity of paint or other fluid F (Fig. 6) which is packed in the can becomes caught in the friction channel. This fluid may be deposited in the channel in various ways, such as during pouring of the contents from the can, during mixing of the contents, or from drainage resulting from the use of the curl 19 as a brush wiper. Unless this fluid is removed in some manner, it prevents complete insertion of the friction plug bead 26 into the channel 15 when it is desired to reclose the container to preserve the unused portion of the contents.

To permit the escape of this entrapped fluid F (Fig. 6), the inner friction wall 28 of the cover bead 26 is formed with a series of equispaced and equisized recesses or offsets 35 (Figs. 1, 2, 3, 6) which are impressed outwardly and extend for the full height of the wall 28 to set off escape channels or passageways 36 between the inner friction walls 17 and 28.

These passageways 36 preferably are so dimensioned and spaced apart that their total circumferential length is considerably less than the total circumferential length of the remaining areas of frictional contact 37 between the inner friction wall 17 of the ring 12 and the inner friction wall 28 of the cover 25 intermediate the passageways 36 (see Fig. 3). Thus, the strong mechanical friction seal between the plug and the can body which results from the multiwalled frictional contact is almost completely retained. The hermetic seal is, of course, maintained by the frictional contact between the outer walls 16 and 27 and the curved walls 18 and 29 respectively of the friction ring 12 and the cover 25.

When the cover is positioned over the channel 15 of the ring 12 and pressed downwardly to seal the can, the curved bottom wall section 29 of the cover bead 26 presses against the surface of the entrapped fluid F in the channel 15, and acts as a piston to force the fluid through the escape passageways 36 and into the interior of the container. The path of the fluid F is illustrated by arrows in Fig. 6, wherein the plug cover 25 is shown in the process of being pressed home into sealing position in the channel 15. When fully pressed home into a previously clogged channel, the plug will assume the position illustrated in Fig. 2 but the passageways 36 will be filled with that small portion of the originally entrapped fluid F which cannot be expressed by the plug but which does not interfere with the tightness of the reclosure. This filled condition of the passageways 36 is not shown in Fig. 2.

The depth to which the offsets 35 are impressed in the friction wall 28 is determined by the nature of the fluid packed in the container, and as a general rule, should increase with an increase in the viscosity of the fluid. Light-bodied products which flow easily require only shallow offsets which create passageways of small cross-sectional area, while heavier, more viscous fluids need larger ecape passageways.

Figs. 4 and 5 illustrate a slightly modified form of the invention, wherein the offsets, here designated by the numeral 39, are impressed in the inner friction wall 17 of the body friction ring 12. These offsets 39 extend for the full height of the wall 17 and set off escape passageways 40 which perform the same function as the passageways 36 of Figs. 1, 2, 3 and 6.

In Fig. 4, the bead 31 and the curl 19 are shown in engagement when the plug 25 is fully seated. This provides an additional friction seal which may be desirable in some instances to prevent the contents of the container from splashing into the passageways prior to the time the plug 25 is removed by the ultimate consumer. This additional friction seal may, of course, be utilized in the construction illustrated in Fig. 2 and does not prevent displacement of the entrapped fluid F when the plug is pressed downwardly, since the contact between the curl 19 and the bead 31 is not made until the plug is fully seated in the channel 15.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A friction top container for paint or similar fluids comprising, a containing member, a sealing channel formed in said containing member, said channel being defined by an inner and an outer wall, a cover member, and a sealing bead formed in said cover member and adapted to frictionally engage within said channel to seal said containing member, said bead having an inner and an outer wall, a portion of one of said inner walls being offset to permit fluid that is entrapped in said channel to be forced through the space thus created between said inner walls and into the interior of said containing member when said cover member is pressed into sealing position.

2. A friction top container for paint or similar fluids comprising a containing member, a substantially U-shaped sealing channel formed in said containing member, said channel being defined by an inner and an outer wall, a cover member, a substantially U-shaped sealing bead formed in said cover member, said bead being adapted to frictionally engage within said channel and having an inner and an outer wall, at least one offset formed in one of said inner walls, said offset creating an escape passageway to permit fluid that is entrapped in said channel to be forced through said passageway and into the interior of said containing member when said cover member is pressed into sealing position.

3. A friction top container for paint or similar fluids comprising, a containing member, a substantially U-shaped annular sealing channel formed in said containing member, said channel being defined by an inner and an outer friction wall, a cover member, a substantially U-shaped annular sealing bead formed in said cover member, said bead being adapted to frictionally engage within said channel and having an inner and an outer friction wall, and a plurality of spaced offsets formed in said inner friction wall of said bead to create escape passageways between said inner friction walls whereby fluid that is entrapped in said channel will be forced through said passageway and into the interior of said containing member when said cover member is pressed into sealing position.

4. A friction top container for paint or similar fluids comprising, a containing member, a substantially U-shaped annular sealing channel formed in said containing member, said channel being defined by an inner and an outer friction wall, a cover member, a substantially U-shaped annular sealing bead formed in said cover member, said bead being adapted to frictionally engage within said channel and having an inner and an outer friction wall, and a plurality of spaced offsets formed in said inner friction wall defining said channel to create escape passageways between said inner friction walls whereby fluid that is entrapped in said channel will be forced through said passageways and into the interior of said containing member when said cover member is pressed into sealing position.

5. A friction top container for paint and the like comprising, a containing member, a substantially U-shaped sealing channel formed in said containing member, said channel being defined by an inner and an outer wall, a cover member, a substantially U-shaped sealing bead formed in said member, said bead being adapted to frictionally engage within said channel and having an inner and an outer wall, at least one offset formed in one of said inner walls, said offset creating an escape passageway to permit fluid that is entrapped in said channel to be forced through said passageway and into the interior of said containing member when said cover member is pressed into sealing position, and means for sealing said passageway from communication with the interior of said containing member when said sealing bead is fully seated in said sealing channel.

6. A friction top container for paint and the like fluid comprising, a body member, a friction ring attached to said body and surrounding a mouth of said container, a sealing channel formed in said friction ring, said channel being defined by an inner and an outer wall, a cover member, and a sealing bead formed in said cover member and adapted to frictionally engage within said channel to seal said container, said bead having an inner and an outer wall, a portion of one of said inner walls being offset to permit fluid that is entrapped in said channel to be forced through the space thus created between said inner walls and into the interior of said container when said cover member is pressed into sealing position.

ANNIE B. ERB,
*Executrix of the Estate of George C. Erb, Deceased.*

REFERENCES CITED

The following references are of record in the file of this patent:

UNITED STATES PATENTS

| Number | Name | Date |
| --- | --- | --- |
| 795,128 | Hodgson | July 18, 1905 |
| 2,084,084 | Greer | June 15, 1937 |
| 2,207,210 | Van Knauf | July 9, 1940 |